United States Patent
Heching et al.

(10) Patent No.: US 6,760,632 B1
(45) Date of Patent: Jul. 6, 2004

(54) COMPUTER METHOD FOR PROVIDING OPTIMIZATION FOR BUSINESS PROCESSES

(75) Inventors: Aliza Rivka Heching, Bronx, NY (US); Ying Tat Leung, Tarrytown, NY (US); Menachem Levanoni, Yorktown Heights, NY (US); Gyana Ranjan Parija, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 447 days.

(21) Appl. No.: 09/631,793

(22) Filed: Aug. 3, 2000

(51) Int. Cl.[7] .............................................. G06F 17/60
(52) U.S. Cl. .............................. 700/33; 700/34; 705/10
(58) Field of Search ........................ 700/33, 34; 705/7, 705/10

(56) References Cited

U.S. PATENT DOCUMENTS 4,802,091 A * 1/1989 Cocke et al. ............... 717/160
5,630,070 A * 5/1997 Dietrich et al. ................ 705/8
5,999,714 A * 12/1999 Conn et al. .................... 716/2

* cited by examiner

Primary Examiner—Emanuel Todd Voeltz
(74) Attorney, Agent, or Firm—Stephen C. Kaufman, Esq.; McGinn & Gibb, PLLC

(57) ABSTRACT

A computer method for providing optimization for business processes for situations wherein there is defined a functional form y=f(x,b), where x comprises a set of independent controllable variables x={x1, ... xn}, b comprises a set of functional parameters b={b1, ... bm}, and y comprises a dependent uncontrollable business variable, f(x,b) subject to constraints on the dependent uncontrollable business variable y. The method comprises the steps of converting the constraints on y to constraints on b by using a functional estimate of y and its business variables (parameters) b; optimizing the function f(x,b) subject to the converted constraints on its business variables (parameters) b; and generating from step (ii) a set of optimized values of b which can optimize the dependent business variable y.

20 Claims, 2 Drawing Sheets

COMPUTER METHOD FOR PROVIDING OPTIMIZATION FOR BUSINESS PROCESSES

BACKGROUND OF THE INVENTION

1. Field of the Invention

This invention relates to a computer method and system for providing optimization for business processes.

2. Introduction to the Invention

The invention is introduced by first setting forth the following known construct.

Given a functional form $y=f(x,b)$ where $x$ is a set of independent controllable variables $x=\{x1, \ldots xn\}$, $b$ is a set of business variables (functional parameters) $b=\{b1, \ldots bm\}$, and $y$ is a dependent uncontrollable variable, it is desired to optimize (e.g., maximize, minimize) $f(x,b)$, i.e. Derive a set $b^*=\{b1^*, \ldots bm^*\}$ which optimizes $f(x,b)$ for an historical dataset comprising observations of independent variables $x$ and their corresponding dependent variable $y$, subject to constraints on the dependent uncontrollable variable $y$, say $g(y)>0$.

Now, if the constraints were on the business parameters $b$, this would be normally solved as a mathematical programming problem (linear, quadratic or nonlinear programming). Here, in the constraints are on the dependent uncontrollable variable $y$. Accordingly, in order to still utilize the powerful mathematical programming techniques, it is necessary to convert the constraints on $y$ to constraints on $b$ using the functional estimate of $y$ and its business parameters $b$ (e.g., $g(y)=gf(x,b)>0$).

In turn, operating on historical data (sets of $x$ and associated $y$) thus yields complete functional description, fully satisfying the given constraints.

SUMMARY OF THE INVENTION

The present invention is cognizant of the aforementioned functional construct. Moreover, the present invention builds upon this known functional construct, but references this known construct to impose upon it novel problems, constraints, and desiderata—of the following illustrative type.

Accordingly, to compute $y$ at a new set of controllable variables, say $x'$, one cannot simply plug $x'$ into the currently optimized $f(x',b^*)$, which is based on the historical data, because there is no guarantee that the resulting $y'$ will satisfy the constraints on the dependent variable, $g(y')>0$.

To insure satisfaction of the constraint at the new point $x'$ we propose to add $f(x',b)$ to the set of constraints (e.g., add $gf(x',b)>0$ to the constraints), and re-run the mathematical program with the new set of constraints. Note that this may affect the resulting function $f(x,b)$ by yielding a new set $b^{**}$, even though no measurements at the new point $x'$ were performed or observed.

If it is desired to compute values of the dependent variable at several new points, then three cases may be considered:

1) if the new points are ordered (e.g., forecasting), the preferred method is to perform sequential adding of the appropriate constraints;
2) if the new points are not ordered, one can derive $y$ for each new point based only on historical data and its own contribution to the set of constraints;
3) alternatively, one can simultaneously derive $y$ for all new points by adding all associated new constraints to the historical set.

We now restate these invention discoveries, by disclosing a first aspect of the present invention comprising a novel computer method for providing optimization for business processes for situations wherein there is defined a functional form $y=f(x,b)$, where $x$ comprises a set of independent controllable variables $x=\{x1, \ldots xn\}$, $b$ comprises a set of functional parameters $b=\{b1, \ldots bm\}$, and $y$ comprises a dependent uncontrollable business variable, $f(x,b)$, subject to constraints on the dependent uncontrollable business variable $y$, the method comprising the steps of:

(i) converting the constraints on $y$ to constraints on $b$ by using a functional estimate of $y$ and its business variables (parameters) $b$;

(ii) optimizing the function $f(x,b)$ subject to the converted constraints on its independent business variables (parameters) $b$;

(iii) generating from step (ii) a set of optimized values of $b$ which can optimize the dependent business variable $y$.

Preferably, the method comprises a step (iv) of computing the dependent business variable $y$ at a new set of the independent variables $x$, said $x$ not being part of an historical set of $x$ variables inherited from step (ii). In particular, this step preferably further comprises guaranteeing that the computed $y$ satisfies the constraints on the dependent business variable $y$ at the new set of independent variables $x$.

Preferably, the method can alternatively comprise a step (iv) of computing values of the dependent business variable at several new points of the independent variable $x$. In particular, this step preferably further comprises steps of determining that the new points are ordered, and, sequentially adding the appropriate constraints.

Preferably, moreover, the method can alternatively comprise steps of determining that the new points are not ordered, and, deriving why at each new point based only on historical data and y's own contribution to the set of constraints.

The method as summarized also includes an advantageous capability comprising the steps of computing values of the dependent business variable at several new points of the independent variables $x$, and, simultaneously deriving $y$ for all new points by a step of adding all associated new constraints to the historical set.

In a second aspect of the present invention, we disclose a program storage device, readable by machine to perform method steps for providing optimization for business processes for situations wherein there is defined a functional form $y=f(x,b)$, where $x$ comprises a set of independent controllable variables $x=\{x1, \ldots xn\}$, $b$ comprises a set of functional parameters $b=\{b1, \ldots bm\}$, and $y$ comprises a dependent uncontrollable business variable $f(x,b)$ subject to constraints on the dependent uncontrollable business variable $y$, the method comprising the steps of:

(i) converting the constraints on $y$ to constraints on $b$ by using a functional estimate of $y$ and its business variables (parameters) $b$;

(ii) optimizing the function $f(x,b)$ subject to the converted constraints on its business variables (parameters) $b$; and (iii) generating from step (ii) a set of optimized values of $b$ which optimizes the dependent business variable $y$.

In a third aspect of the present invention, we disclose a computer for providing optimization for business processes, the computer comprising:

(i) means for inputting data defining a functional form $y=f(x,b)$, where $x$ comprises a set of independent controllable variables $x=\{x1, \ldots xn\}$, $b$ comprises a set of functional parameters b={b1, . . . bm}, and y comprises a dependent uncontrollable business variable, f(x,b) subject to constraints on the dependent uncontrollable business variable y;

(ii) means for converting the constraints on y to constraints on x by using a functional estimate of y and its business variables (parameters) b;

(iii) means for optimizing the function f(x) subject to the converted constraints on its business variables (parameters) b;

(iv) means for generating from element (iii) a set of optimized values of b which optimizes the dependent business variable y; and (v) means for displaying the set of optimized values of b and the resulting business variable y.

BRIEF DESCRIPTION OF THE DRAWING

The invention is illustrated in the accompanying drawing, in which.

DETAILED DESCRIPTION OF THE PRESENT INVENTION

Figure 1:
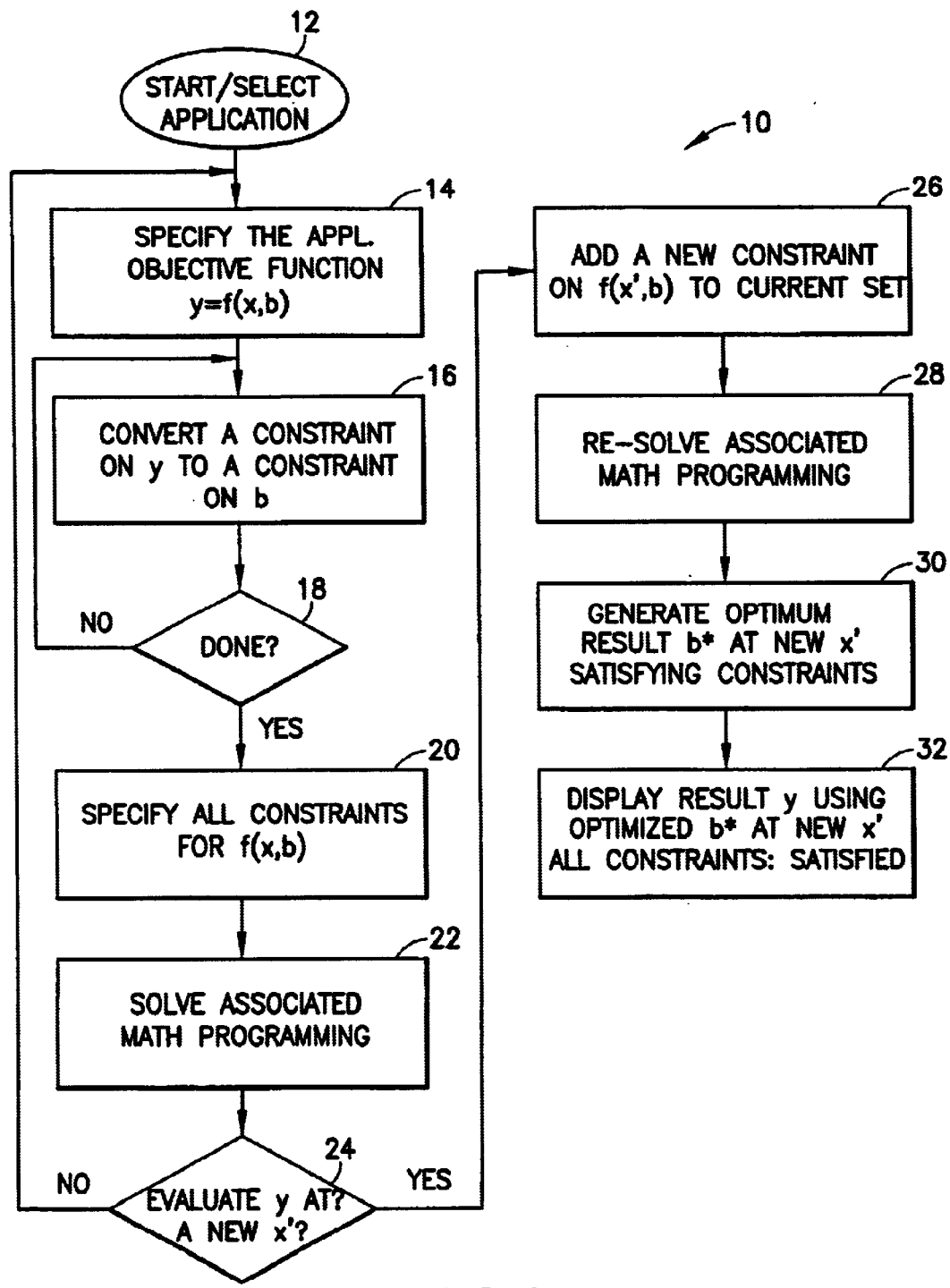
FIG. 1 is a flow chart describing a functional operation of the subject matter and FIG. 2 illustrates exemplary embodiments of the invention of an exemplary program storage device and an exemplary computer.

We have asserted above that to compute y at a new set of controllable variables, say x', one cannot simply plug x' into the current f(x',b*), which is based on the historical data, because there is no guarantee that the resulting y' will satisfy the constraints on the dependent variable, g(y')>0. To insure satisfaction of the constraint at the new point x', we propose to add f(x',b) to the set of constraints (e.g., add gf(x',b)>0 to the constraints), and re-run the mathematical program with the new set of constraints. Note that this may affect the resulting function f(x,b) even though no measurements at the new point x' were performed or observed. Instruction to this end is also provided in FIG. 1 (10–32).

If it is desired to compute values of the dependent variable at several new points, then three cases may be considered:

1) if the new points are ordered (e.g., forecasting), the preferred method is to perform sequential adding of the appropriate constraints;

2) if the new points are not ordered, one can derive y for each new point based only on historical data and its own contribution to the set of constraints;

3) alternatively, one can simultaneously derive y for all new points by adding all associated new constraints to the historical set.

As a specific example, consider the case of constrained linear regression where the constraint is on the dependent variable. In this case, the functional form is: y=b1x1+b2x2+ e, where y represents the dependent variable (say sales), x1 is an independent variables (say price), x2 is another independent variable (say promotion), b1 and b2 are model coefficients (to be determined), and e is a residual noise (to be minimized via adjustments of b1 and b2). Historical data provide a set of y values and a numerical "design" matrix X, consisting of two columns (for x1 and x2). To perform the regression using the given set of observations y and the "design" matrix X, one preferably minimizes the square error (y–Xb,y–Xb) where b is a vector of b1 and b2. The regression preferably searches for optimal values of b which minimize the squared error. In addition, there are constraints on y, for example, y>0 (if y represents sales than y>0 insures no negative sales). One may also have constraints on x, for example x1>0 (if x1 represents price than x1>0 insures no negative prices). The constraints on x1 are typical for linear programming problems. The constraints on y can be included only by replacing them with their functional estimates Xb. The problem, then, can be solved via linear programming routines, yielding optimized values of b1 and b2.

If, however, it is wished to predict y for a new point, not included in the historical set X (e.g., sales forecasting at a new price and promotion), using the parameters derived from the historical data by plugging x1' and x2' result in y'=b1x1'+b2x2' where y' may be negative. In this case, the solution does not satisfy at least one constraint and is therefore incorrect. The solution provided in this invention guarantees consistent results satisfying all constraints. The solution entails adding a new constraint for the new point (e.g., b1x1'+b2x2'>0). Note that here a constraint has been added at a point that has not yet been observed, i.e., we are proposing to modify the resulting function (i.e., modify the coefficients b) to guarantee consistency, without observing y at the new point. In other words, we are adding a new constraint at the new point without adding the corresponding error term to the squared error to be minimized.

Figure 2:
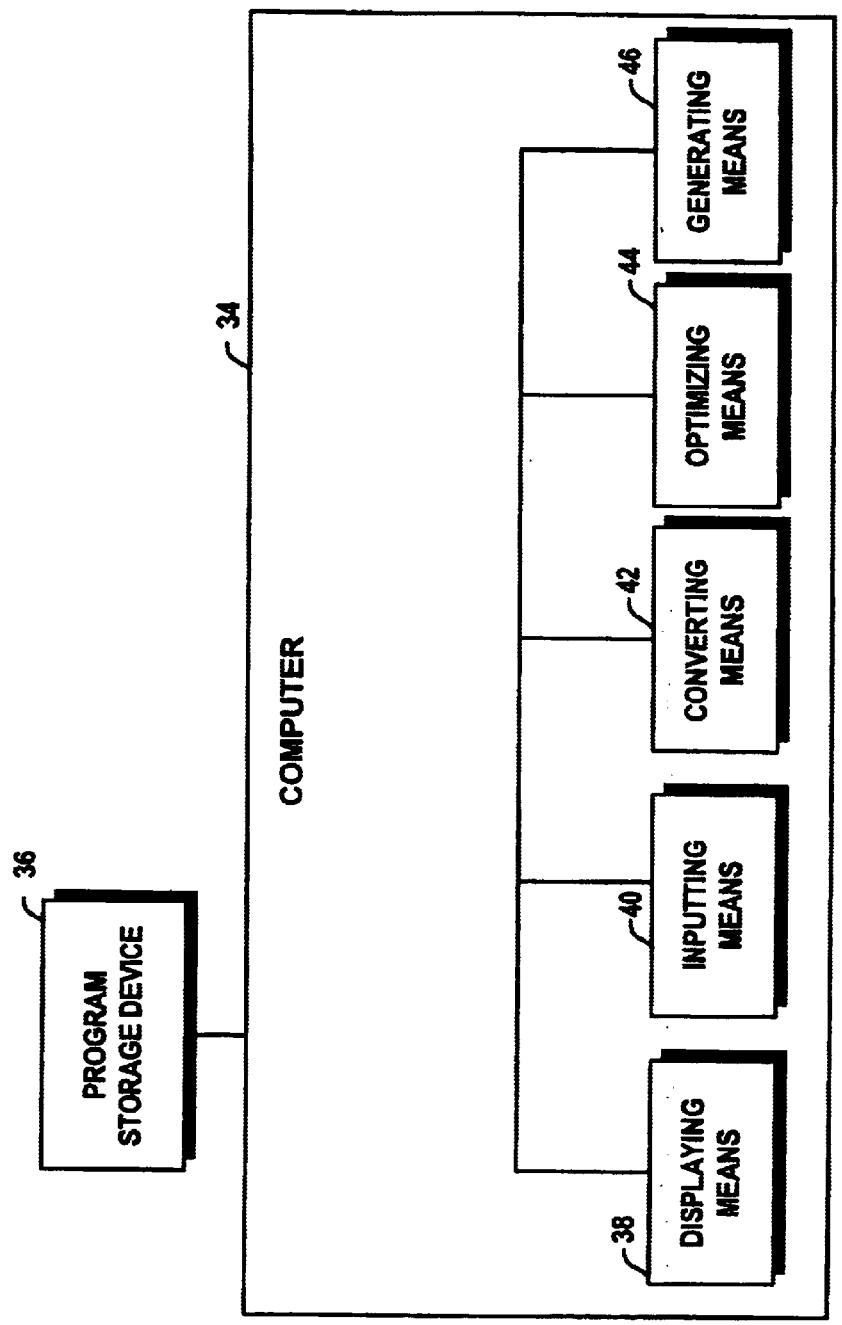

It is well understood that the computer system and method of the present invention can be implemented using a plurality of separate dedicated or programmable integrated or other electronic circuits or devices (e.g., hardwired or logic circuits such as discrete element circuits, or programmable logic devices such as PLDs, PLA, PALs, or the like). As shown in FIG. 2, a suitably programmed general purpose computer X, e.g., a microprocessor, microcontroller, or other processor devices (CPU or MPU), either alone or in conjunction with one or more peripheral (e.g., integrated circuit) data and signal processing devices can be used to implement the invention. In general, any device or assembly of devices on which a finite state machine capable of implementing the flow charts shown in FIG. 1.

FIG. 2 illustrates a program storage device 36, operably connected to computer 34, and readable by machine to perform method steps for providing optimization for business processes for situations wherein there is defined a functional form y=f(x,b), where x comprises a set of independent controllable variables x={x1, . . . xn}, b comprises a set of functional parameters b={b1, . . . bm}, and y comprises a dependent uncontrollable business variable, f(x,b) subject to constraints on the dependent uncontrollable business variable y.

The method comprises converting by the program storage device, the constraints on y to constraints on b by using a functional estimate of y and the business variables (parameters) b. The method also comprises optimizing, by the program storage device, the function f(x,b) subject to the converted constraints on the business variables (parameters) b, and generating, by the program storage device, from the optimizing the function, a set of optimized values of b which can optimize the dependent business variable y.

FIG. 2 further illustrates a computer 34 for providing optimization for business processes. The computer 34 includes means for inputting data 40 defining a functional form y=f(x,b), where x comprises a set of independent controllable variables x={x1, . . . xn}, b comprises a set of functional parameters b={b1, . . . bm}, and y comprises a dependent uncontrollable business variable, f(x,b) subject to constraints on the dependent uncontrollable business variable y. Computer 34 also includes means for converting 42 the constraints on y to constraints on x by using a functional estimate of y and the business variables (parameters) b, means for optimizing 44 the function f(x,b) subject to the converted constraints on its business variables (parameters) b. Further, computer 34 includes means for generating 46, from the means for optimizing, a set of optimized values of b which optimizes the dependent business variable y, and means for displaying 38 the set of optimized values of b and the resulting business variable y.

What is claimed:

1. A computer method for providing optimization for business processes for situations wherein there is defined a functional form y=f(x,b), where x comprises a set of independent controllable variables x={x1, ... xn}, b comprises a set of functional parameters b={b1, ... bm}, and y comprises a dependent uncontrollable business variable, f(x,b) subject to constraints on the dependent uncontrollable business variable y, the method comprising:

converting, by said computer, the constraints on y to constraints on b by using a functional estimate of y and the business variables (parameters) b;

optimizing, by said computer, the function f(x,b) subject to the converted constraints on the business variables (parameters) b; and generating, by said computer, from the optimizing the function, a set of optimized values of b which can optimize the dependent business variable y.

2. A computer method according to claim 1, further comprising:

computing, by said computer, the dependent business variable y at a new set of the independent variables x, said x not being part of an historical set of x variables inherited from the electronically optimizing the function.

3. A computer method according to claim 2, further comprising:

guaranteeing, by said computer, that the computed y satisfies the constraints on the dependent business variable y at the new set of independent variables.

4. A computer method according to claim 1, further comprising:

computing, by said computer, values of the dependent business variable at several new points of the independent variable x.

5. A computer method according to claim 4, further comprising:

determining, by said computer, that the new points are ordered; and sequentially adding, by said computer, the appropriate constraints.

6. A computer method according to claim 4, further comprising:

determining, by said computer, that the new points are not ordered; and deriving, by said computer, y at each new point based only on historical data and a contribution of y to the set of constraints.

7. A computer method according to claim 4, further comprising:

simultaneously deriving y for all new points by adding all associated new constraints to the historical set.

8. The method of claim 1, further comprising:

computing values of the dependent uncontrollable business variable at several new points of the independent variable.

9. The method of claim 8, further comprising:

determining that the new points are ordered; and sequentially adding the appropriate constraints.

10. The method of claim 8, further comprising:

determining that the new points are not ordered; and deriving the dependent uncontrollable business variable at each new point based only on historical data and the contribution by the dependent uncontrollable business variable to the set of constraints.

11. The method of claim 8, further comprising:

simultaneously deriving the dependent uncontrollable business variable for all new points by electronically adding all associated new constraints to the historical set.

12. A program storage device, readable by machine to perform method steps for providing optimization for business processes for situations wherein there is defined a functional form y=f(x,b), where x comprises a set of independent controllable variables x={x1, ... xn}, b comprises a set of functional parameters b={b1, ... bm}, and y comprises a dependent uncontrollable business variable, f(x,b) subject to constraints on the dependent uncontrollable business variable y, the method comprising:

converting, by said program storage device, the constraints on y to constraints on b by using a functional estimate of y and the business variables (parameters) b;

optimizing, by said program storage device, from f(x,b) subject to the converted constraints on the business variables parameters) b; and generating, by said program storage device, from the optimizing, by said program storage device, the function, a set of optimized values of b which can optimize the dependent business variable y.

13. A computer for providing optimization for business processes, the computer comprising:

means for inputting data defining a functional form y=(x, b), where x comprises a set of independent controllable variables x={x1, ... xn}, b comprises a set of functional parameters b={b1, ... bm}, and y comprises a dependent uncontrollable business variable, f(x,b) subject to constraints on the dependent uncontrollable business variable y;

means for converting the constraints on y to constraints on x by using a functional estimate of y and the functional business parameters b;

means for optimizing the function f(x,b) subject to the converted constraints on its the functional business parameters b;

means for generating, from the means for optimizing, a set of optimized values of the parameters b which optimizes the dependent business variable y; and means for displaying the set of optimized values of the parameters b and the resulting business variable y.

14. A method for optimizing business processes, comprising:

operating a computer to:

provide an independent controllable variable and a functional business parameter that together are a function of a dependent uncontrollable business variable, wherein the function is subject to constraints on the dependent uncontrollable business variable;

convert the constraint on the uncontrollable business variable to a constraint on the functional business parameter by using a functional estimate of the uncontrollable business variable and the functional business parameter; and optimize the function subject to the converted constraint on the functional business parameter.

15. The method of claim 14, further comprising;

operating a computer to generate an optimized value of the functional business parameter which can optimize the dependent uncontrollable business variable.

16. The method of claim 14, further comprising:

computing the dependent uncontrollable business variable at a set of independent variables, said set of independent variables being different from an historical set of independent variables inherited from the operating a computer to optimize the function.

17. The method of claim 16, further comprising:

verifying that the computed dependent uncontrollable business variable satisfies the constraints on the dependent uncontrollable business variable at the new set of independent variables.

18. A computer-readable medium having computer-executable instructions for performing a method for optimizing business processes, comprising:

providing an independent controllable variable and a functional business parameter that together are a function of a dependent uncontrollable business variable, wherein the function is subject to constraints on the dependent uncontrollable business variable;

converting the constraint on the uncontrollable business variable to a constraint on the functional business parameter by using a functional estimate of the uncontrollable business variable and the functional business parameter; and optimizing the function subject to the converted constraint on the functional business parameter.

19. The computer-readable medium of claim 18, further comprising:

generating an optimized value of the functional business parameter which can optimize the dependent uncontrollable business variable.

20. The computer-readable medium of claim 18, further comprising:

computing the dependent uncontrollable business variable at a set of independent variables, said set of independent variables being different from an historical set of independent variables inherited from the operating a computer to optimize the function.

* * * * *